Aug. 28, 1928.
R. A. SHEFVELAND
1,682,097
SEATING AND UNSEATING TOOL
Filed Aug. 28, 1926
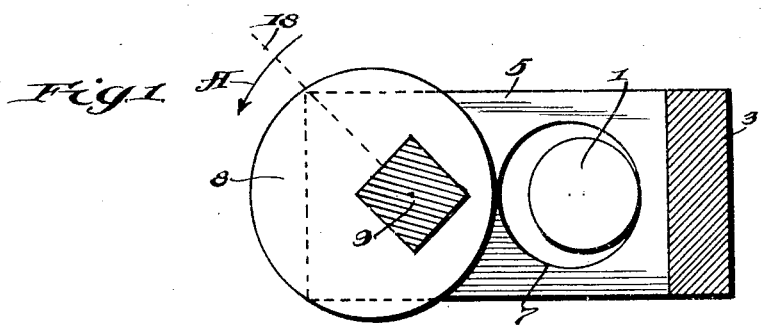
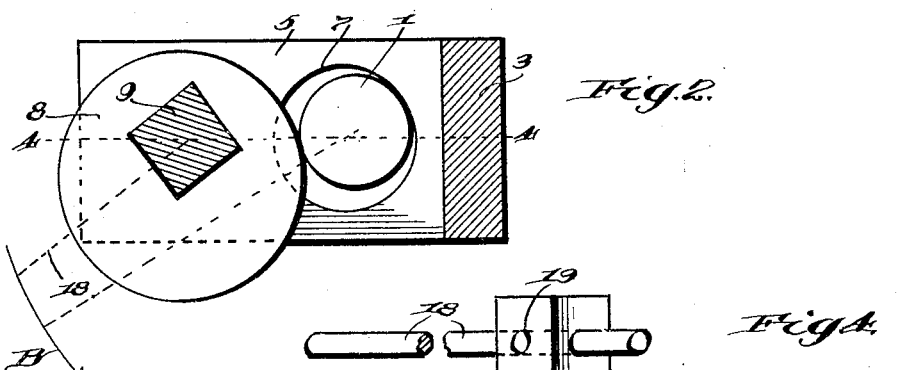
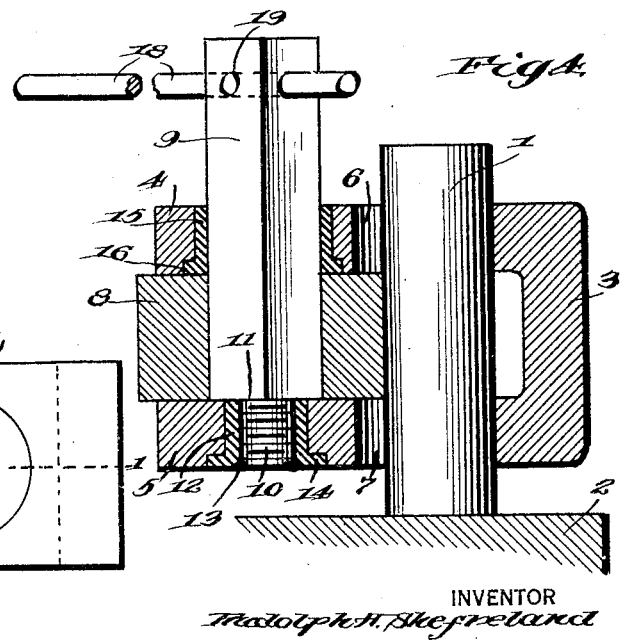
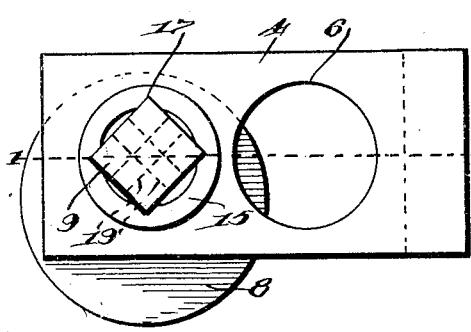
INVENTOR
Rudolph A. Shefveland
BY
Carl M. Crawford
ATTORNEY Patented Aug. 28, 1928.

1,682,097

UNITED STATES PATENT OFFICE.

RUDOLPH A. SHEFVELAND, OF SPOKANE, WASHINGTON, ASSIGNOR OF ONE-HALF TO M. M. KELLIHER, OF SPOKANE, WASHINGTON.

SEATING AND UNSEATING TOOL.

Application filed August 28, 1926. Serial No. 132,246.

The object of this invention is to provide an improved frictionally acting tool whereby cylindrical members such as rods or pipes may be turned into seated or unseated relation with respect to the part to which they have threaded or other connection.

The device of my invention involves a frame adapted for swivelled connection with the member to be turned, and a gripper adapted for coaction with the frame and such member to grip the latter, the frame and the gripper being bodily rotated about the axis of the member to be turned, while in the act of turning the same.

A further object of the invention is to provide a device of this character which is arranged and constructed to operate upon a limited but usual range of sizes of members without requiring any adjustment of the device therefor.

A further novel feature consists in a frame of U-shape with openings therein for receiving the member to be turned, the frame being an integral body whereby the openings will always be in alined relation to receive such member.

A still further object of the invention is to provide an actuating shaft which is rotatable in the frame and non-rotatably connected with the gripper whereby the frame will at all times be floatingly related to the member to be turned.

The invention has many other features and advantages which will be more fully described in connection with the accompanying drawing and which will be more particularly pointed out in and by the appended claims.

In the drawing:

Fig. 1, is a sectional view taken on line 1—1 of Fig. 3, before the gripper is tightened against the member to be turned.

Fig. 2, is a similar view after the gripper has been adjusted into engagement with the member.

Fig. 3, is a top plan view of the device.

Fig. 4, is a sectional view on line 4—4 of Fig. 2.

Like characters of reference designate similar parts throughout the different figures of the drawing.

I have illustrated the device of my invention in connection with a stud bolt 1, of an engine block 2, in order to show how in one embodiment, the invention operates to seat or unseat a cylindrical member, although it will be understood that I do not wish to be limited to this particular utility of my invention.

Reverting to the structure shown, I employ a frame which is in the form of an integral U-shaped body having a bight 3, a normally upper limb 4, and a normally lower limb 5. Preferably near the bight 3, I provide the frame with means whereby the latter may be swivelled upon the member to be turned, and as shown, such means takes the form of alined openings 6 and 7. Said openings 6 and 7 are of sufficient size to receive members of a usual range of diameter within reasonable limits, without requiring any adjustment of the device. In the drawing, I have shown the device in connection with the smallest diameter of member within such range. It will be seen that by making the frame U-shaped and in integral or rigid form, I assure alinement of the openings 6 and 7 thereby greatly facilitating the application of the device to the member to be turned. Further, and as will presently appear, the openings are in closely spaced relation thereby not only enabling me to engage the member at a plurality of points of contact, but with the points of contact so closely spaced as to avoid all possibility of buckling the member when gripping stress is applied thereto.

Between the limbs 4 and 5, and preferably on that side of the member 1, remote from the bight 3, is a gripper 8, of novel construction. As shown, said gripper 8, is in the form of a cylindrical block, the periphery of which may be suitably roughened, if desired. The gripper is shown fitting snugly between the limbs 4 and 5, so that any torsional stress to which it may be subjected will be sustained by the rigid frame, herein shown. Eccentrically with respect to its center, said gripper is provided with a bore of polygonal cross section, preferably square, the degree of eccentricity being such, and the diameter of the gripper being sufficient, to afford the latter ample range for gripping any size member that might be received in the openings 6 and 7.

I will next describe the novel means shown for actuating said gripper.

A shaft 9, is shown, and said shaft, throughout the major portion of its length, is polygonal, and preferably square in cross section, thereby enabling me to employ stock material for the same. The normally lower end 10, of said shaft, is reduced thereby forming a shoulder 11 whereby the normally lower end of said shaft will engage the top face of limb 5, thereby limiting endwise movement of said shaft in one direction with respect to the frame. A collar, preferably in the form of a cylindrical nut 12, is threaded onto the reduced threaded end 10, and I advisedly upset the stock at 13, to insure non-rotative connection between the reduced end 10 and the collar or nut 12. If desired, the threaded connection may be omitted, and the collar secured to the shaft in any desirable rigid manner. I provide the collar 12, with a flange 14, which seats in a suitable recess in the lower face of limb 5, as shown, thus avoiding any projecting parts which would prevent the tool from being disposed in close relation to the top of block 2. It will now be clear that the lower end of the shaft 9 is rotatively mounted in limb 5.

I will next describe the novel means of rotatively mounting the shaft in limb 4, without turning the shaft down cylindrically.

A collar 15, having a cylindrical periphery and bore, is disposed in a suitable opening in limb 4, and is provided with a flange 16, adapted to seat in a recess in the lower face of limb 4. This flange prevents the collar 15 from working up, and the gripper 8, holds the collar in place from below. The bore of collar 15 is notched to receive the apices 17, of shaft 9, as will be clear by reference to Fig. 3. Thus, the shaft 9, is non-rotatively connected with collar 15 and the latter rotates freely in limb 4.

Any suitable means may be provided or used to impart rotative gripping thrust to shaft 9, and in the drawing, I have shown a turning rod 18, which may be inserted through a suitable bore 19.

In assembling the device, the collar 15 is first inserted in the opening in limb 4, the gripper 8, next being inserted, thereby holding the collar 15 in place. The shaft 9, is next inserted into the position shown in Fig. 4, and then nut 12 is turned home, as shown, and finally anchored by upsetting portions of the stock at 13, or in any other suitable way. With the parts assembled as shown in Fig. 4, it will be seen that they cannot become dis-assembled.

I will next describe one manner of operating the device of my invention.

With the device swivelled over the stud bolt 1, as shown in Fig. 1, the shaft 9 is turned, either to the right or left, dependent upon the space available, in order to impinge a portion of the periphery of the gripper 8, against the stud bolt 1. In Fig. 2, I have shown the gripper actuated in a contra-clockwise direction impinging the bolt 1 against a portion of the openings 6 and 7. After the gripper 8 has been rotated as far as possible about its own axis into the position shown in Fig. 2, then any further thrust on rod 18, will act to bodily rotate the entire device about the axis of the stud bolt 1, or in other words, about the element to be seated or unseated. I have shown by arrow A, how the shaft 9 is turned about its own axis until it reaches the position shown in Fig. 2. In the latter figure, I have shown by arrow B, how the entire device rotates bodily about the axis of stud 1.

The lines indicated by numeral 18, indicate the position of rod 18, in Figs. 1 and 2.

It will be clear that as the rod 18 is thrust in a contra-clockwise direction, the stud 1, interposed between gripper 8 and portions of the openings 6 and 7, will be the more firmly gripped as pressure is applied, and finally said stud will be forced to turn.

An important feature is that I not only obtain all the leverage that the rod 18 affords, but also the more effective leverage, or additional leverage afforded by the distance between the center of shaft 9, and the center of stud 1.

At this point I desire to emphasize a most important feature of my invention which resides in the application of the combined turning and tightening thrust directly onto the gripper, instead of upon the frame. By means of this construction, the more thrust imparted to the gripper, the more the latter increases its pressure on the stud 1, and further, all the pressure applied to the gripper, is utilized to impart turning movement to the frame around the stud center.

It will be noted that the device of my invention can be used with equal facility in turning the member, whatever it may be, either to the left or right, and that it can be applied to any member having a free end over which the device may be adjusted.

It is believed that the device of my invention will be fully understood from the foregoing description, and while I have herein shown one specific form of my invention, I do not wish to be limited thereto except for such limitations as the claims may import.

I claim:

1. A frictionally acting tool for seating and unseating cylindrical members, comprising, a U-shaped frame having substantially alined openings in the limbs thereof adjacent the bight of said frame for receiving the member to be turned, an actuating shaft rotatively mounted in end portions of the limbs of said frame, and a cylindrical gripper disposed between said limbs and eccentrically and non-rotatively connected with said shaft for actuation thereby to impinge the member to be turned between a peripheral portion of said gripper and portions of the perimeters of said openings.

2. A frictionally acting tool for rotatively seating or unseating a cylindrical member, comprising, a U-shaped frame having normally upper and lower limbs with openings therein to receive the member to be turned, a gripper between said limbs for engagement with such member, a polygonal shaft of uniform cross section extending through the upper limb and through said gripper and having a reduced threaded end extending into said lower limb, a flanged cylindrical nut threaded and locked onto said reduced end and rotatable in said lower limb, and a flanged collar rotatable in said upper limb and secured onto the polygonal portion of said shaft.

In witness whereof, I hereby affix my signature.

RUDOLPH A. SHEFVELAND.